(12) United States Patent
Murakami et al.

(10) Patent No.: US 9,471,105 B2
(45) Date of Patent: Oct. 18, 2016

(54) DISPLAY APPARATUS

(71) Applicant: FUJITSU LIMITED, Kawasaki-shi, Kanagawa (JP)

(72) Inventors: Takeshi Murakami, Kawasaki (JP); Masuo Ohnishi, Hachioji (JP); Yasafumi Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 13/774,552

(22) Filed: Feb. 22, 2013

(65) Prior Publication Data

US 2013/0242482 A1    Sep. 19, 2013

(30) Foreign Application Priority Data

Mar. 19, 2012    (JP) .................................. 2012-061363

(51) Int. Cl.
*G06F 1/16*    (2006.01)

(52) U.S. Cl.
CPC .................................. *G06F 1/1637* (2013.01)

(58) Field of Classification Search
CPC .................................................... G06F 1/1637
USPC .................................................... 361/679.01
See application file for complete search history.

(56) References Cited

U.S. PATENT DOCUMENTS

| | | | | |
|---|---|---|---|---|
| 4,185,220 A * | 1/1980 | Oberg | .................. | H01J 29/896 313/478 |
| 5,894,192 A * | 4/1999 | Grabis | .................. | H01J 29/868 313/478 |
| 6,459,460 B1 * | 10/2002 | Yamanaka | ........ | G02F 1/133308 349/58 |
| 7,667,786 B2 * | 2/2010 | Nouchi | ................ | G02B 6/0088 349/58 |
| 8,305,512 B2 * | 11/2012 | Ju | ...................... | G02F 1/133512 349/58 |
| 8,593,061 B2 * | 11/2013 | Yamada | .............. | H01L 27/3293 313/503 |
| 8,669,948 B2 * | 3/2014 | Kim | .................... | H04M 1/0283 345/173 |
| 8,711,291 B2 * | 4/2014 | Kim | ........................ | H04N 5/64 348/836 |
| 8,853,941 B2 * | 10/2014 | Jung | ..................... | G06F 1/1637 313/504 |
| 2003/0184514 A1 * | 10/2003 | Grosfeld et al. | .............. | 345/156 |
| 2004/0240165 A1 * | 12/2004 | Minaguchi et al. | .......... | 361/683 |
| 2004/0246109 A1 * | 12/2004 | Suzuki et al. | ............. | 340/384.1 |

(Continued)

FOREIGN PATENT DOCUMENTS

| | | |
|---|---|---|
| JP | 10-027066 A | 1/1998 |
| JP | 11-133870 A | 5/1999 |

(Continued)

OTHER PUBLICATIONS

Office Action dated Sep. 8, 2015, issued in counterpart Japanese Patent Application No. 2012-061363, with partial English translation (9 pages).

(Continued)

*Primary Examiner* — Xanthia C Cunningham
(74) *Attorney, Agent, or Firm* — Westerman, Hattori, Daniels & Adrian, LLP

(57) ABSTRACT

A display apparatus includes a display device body with a screen, a frame attached to the display device body, the frame having an opening for exposing the screen, and a panel secured to the frame so as to face the screen, the panel being elastic, wherein the frame has four sides to which the panel is secured and at least one of the four sides has a section projecting ahead of the screen higher than both ends, the section being other than both ends in a longitudinal direction of the at least one of the four sides.

7 Claims, 8 Drawing Sheets

(56) References Cited

U.S. PATENT DOCUMENTS

| | | | |
|---|---|---|---|
| 2012/0249891 A1* | 10/2012 | Sato | G06F 1/1601 348/794 |
| 2013/0002572 A1* | 1/2013 | Jin | G02F 1/133305 345/173 |
| 2014/0063719 A1* | 3/2014 | Yamazaki | G06F 1/1601 361/679.21 |
| 2014/0111910 A1* | 4/2014 | Lin | G06F 1/1637 361/679.01 |
| 2014/0198436 A1* | 7/2014 | Lim | H04M 1/0266 361/679.01 |

FOREIGN PATENT DOCUMENTS

| | | |
|---|---|---|
| JP | 11-289169 A | 10/1999 |
| JP | 2003-233059 A | 8/2003 |
| JP | 2004-294994 A | 10/2004 |

OTHER PUBLICATIONS

Office Action dated Aug. 2, 2016, issued in counterpart Japanese Patent Application No. 2015-219036, with English translation (7 pages).

* cited by examiner

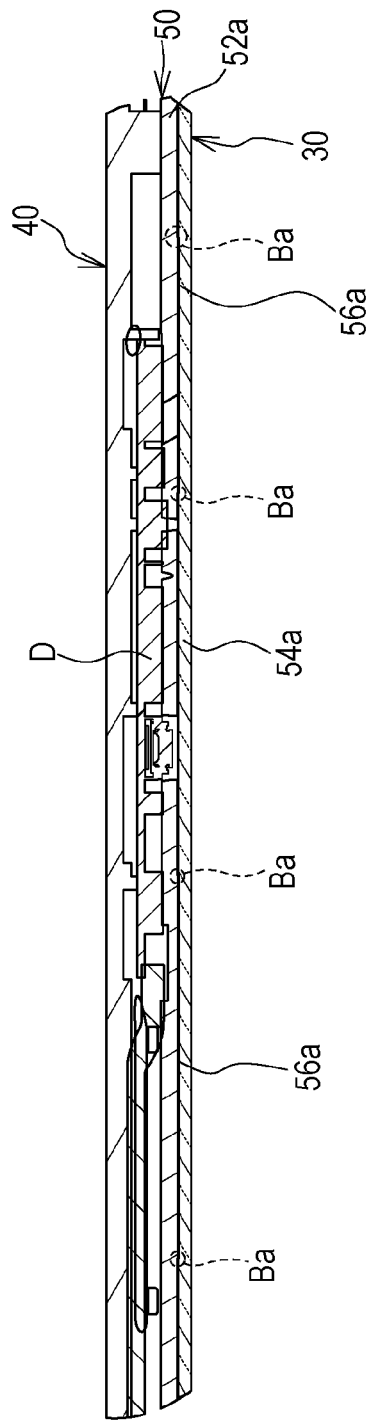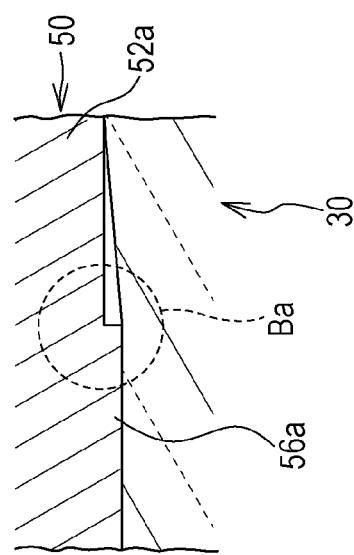

FIG. 6A
FIG. 6B
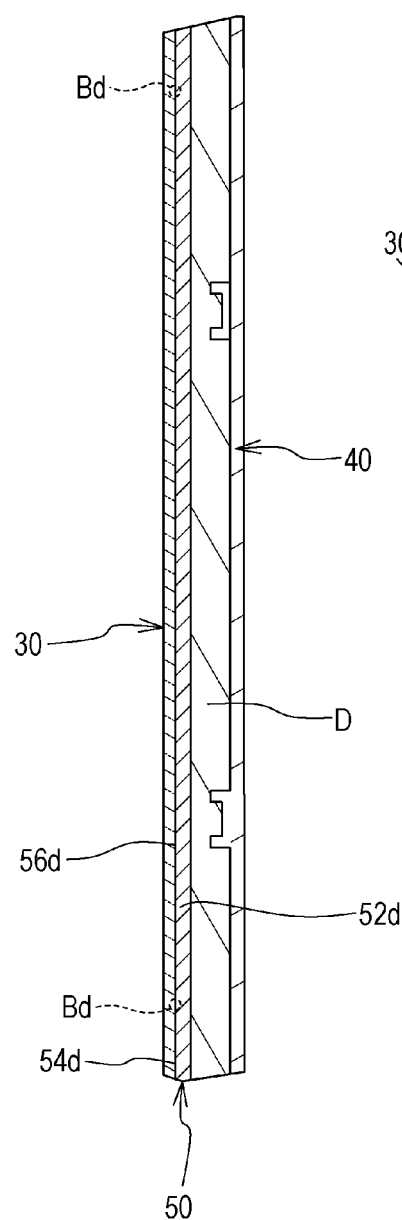
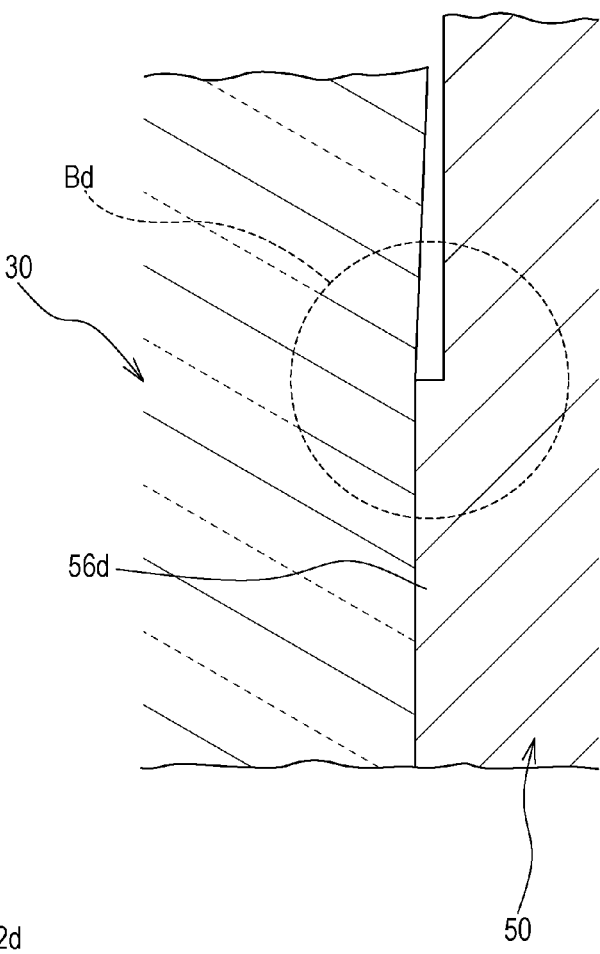

DISPLAY APPARATUS

CROSS-REFERENCE TO RELATED APPLICATION(S)

This application is based upon and claims the benefit of priority of the prior Japanese Patent Application No. 2012-061363, filed on Mar. 19, 2012, the entire contents of which are incorporated herein by reference.

FIELD

The embodiment discussed herein is related to a display apparatus.

BACKGROUND

In some display apparatuses, the frame is secured to the display device body having a screen, and a transparent panel is secured to the frame. Japanese Laid-open Patent Publication No. 2003-233059 and Japanese Laid-open Patent Publication No. 10-27066 disclose technologies related to such display apparatuses.

When a low-profile display apparatus is achieved, it is considered that the thickness of the frame or panel is reduced or the clearance between the panel and the display device body is reduced. However, when the stiffness is reduced by reduction in the thickness of the frame or panel or displacement occurs because an external force is applied when the clearance between the panel and the display device body is small, the panel may partially make contact with the screen of the display device body. This contact may affect the visibility of the screen of the display device body.

SUMMARY

According to an aspect of the embodiments, a display apparatus includes a display device body with a screen, a frame attached to the display device body, the frame having an opening for exposing the screen, and a panel secured to the frame so as to face the screen, the panel being elastic, wherein the frame has four sides to which the panel is secured and at least one of the four sides has a section projecting ahead of the screen higher than both ends, the section being other than both ends in a longitudinal direction of the at least one of the four sides.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a sectional view of section VA-VA in FIG. 4;
FIG. 5B is a partial enlarged view of FIG. 5A;
FIG. 6A is a sectional view of section VIA-VIA in FIG. 4;
FIG. 6B is a partial enlarged view of FIG. 6A.

DESCRIPTION OF EMBODIMENT

Figure 1:
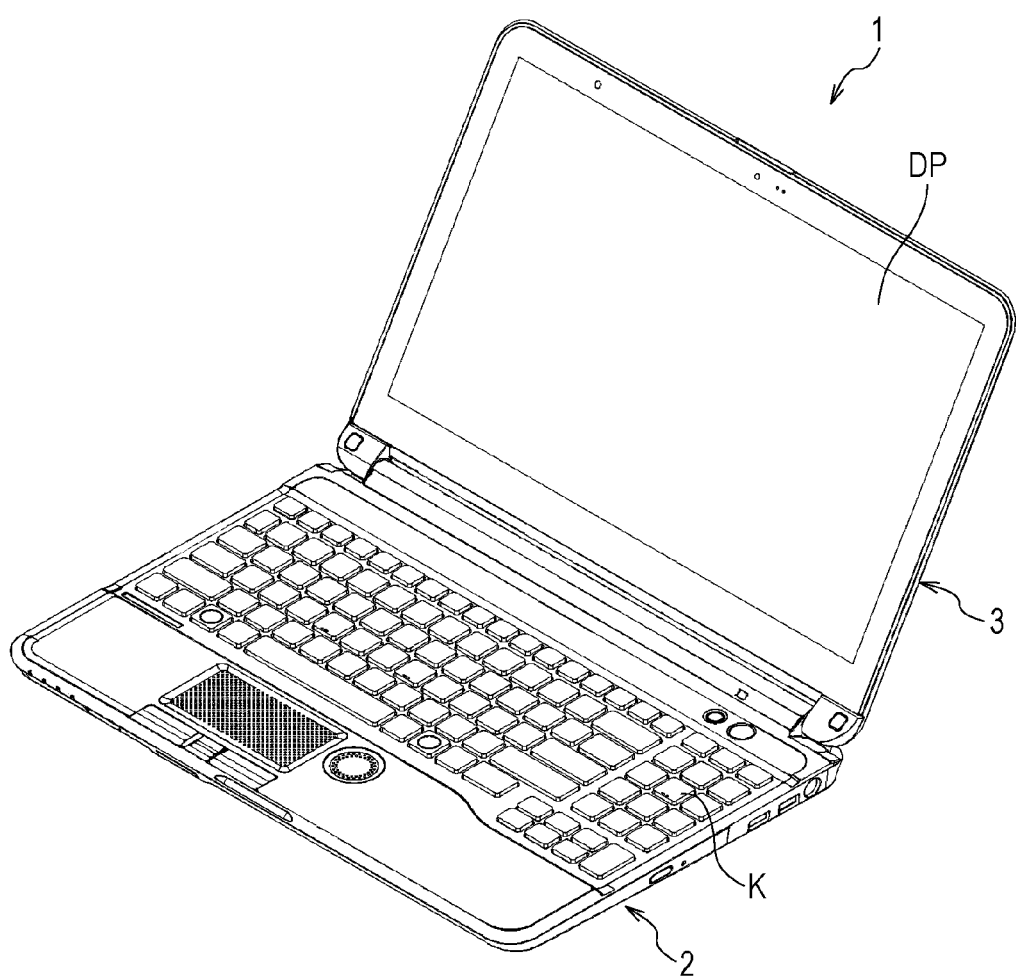
FIG. 1 is a perspective view of a display apparatus.

FIG. 1 is a perspective view of a display apparatus 1. The display apparatus 1 is a notebook computer. The display apparatus 1 includes a body 2 and a display unit 3, which is attached to the body 2 via hinges in an openable and closable manner. The display unit 3 has a screen DP on which images are displayed. The body 2 incorporates a mother board on which electronic components such as a CPU are mounted, and a hard disk drive. The body 2 has a keyboard K used for input operations.

Figure 2:
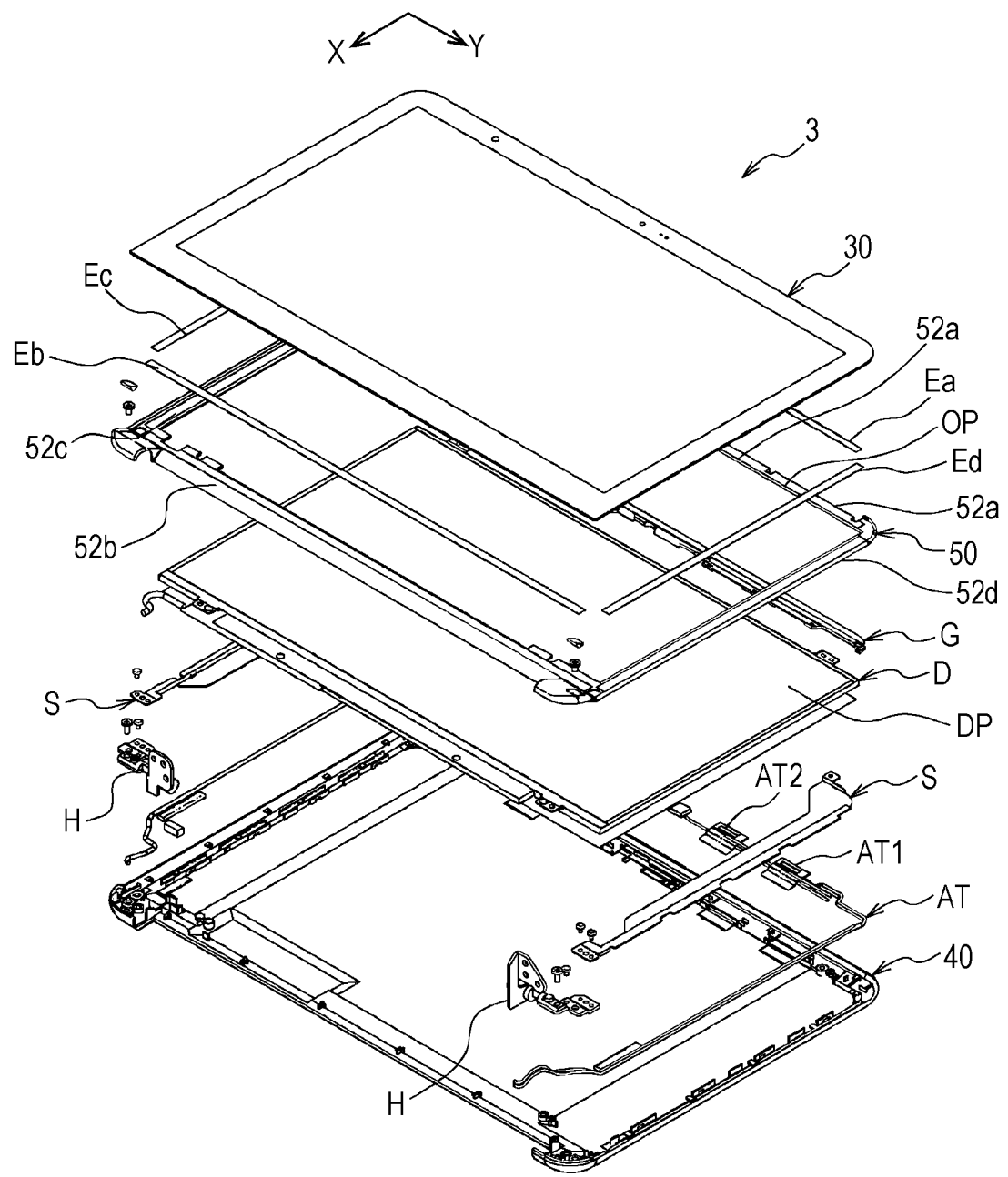
FIG. 2 is an exploded perspective view of a display unit.

FIG. 2 is an exploded perspective view of the display unit 3. The display unit 3 includes a panel 30, a frame 50, a display device D, and a rear case 40. The display device D is an example of a display device body. The frame 50 is secured to a rim on a front side of the display device D. The frame 50 has an opening OP for exposing the screen DP of the display device D. The frame 50 has four sides 52a to 52d. The sides 52a and 52b face each other and the sides 52c and 52d face each other. The sides 52a and 52b are longer than the sides 52c and 52d. The panel 30 is secured to the sides 52a to 52d with double-faced tapes Ea to Ed. The panel 30 is made of elastic transparent resin in this example, but the panel 30 may be, for example, thin glass as long as it is an elastic transparent material. The panel 30 is located in front of the screen DP of the display device D since the frame 50 to which the panel 30 is secured is secured to the display device D. The panel 30 is attached to the frame 50 with the double-faced tapes Ea to Ed in this example, but the panel 30 may be attached to the frame 50 with, for example, adhesive or screws.

A cushion rubber G is placed between the edge of the upper surface of the display device D and the side 52a of the frame 50. Reinforcing metal plates S are secured to both edges on the back side of the screen DP. The rear case 40 is secured to the reinforcing metal plate S with screws. Accordingly, the rear case 40 is secured to the display device D through the reinforcing metal plates S. The frame 50 to which panel 30 is secured is secured to the rear case 40 with screws. An antenna AT is wired between the rear case 40 and the display device D. Planar antennas AT1 and AT2 are conductively connected to the antenna AT. Two hinges H are secured to a lower edge of the displace device D. The hinges H attach the display unit 3 to the body 2 in an openable and closable manner.

Figure 3:
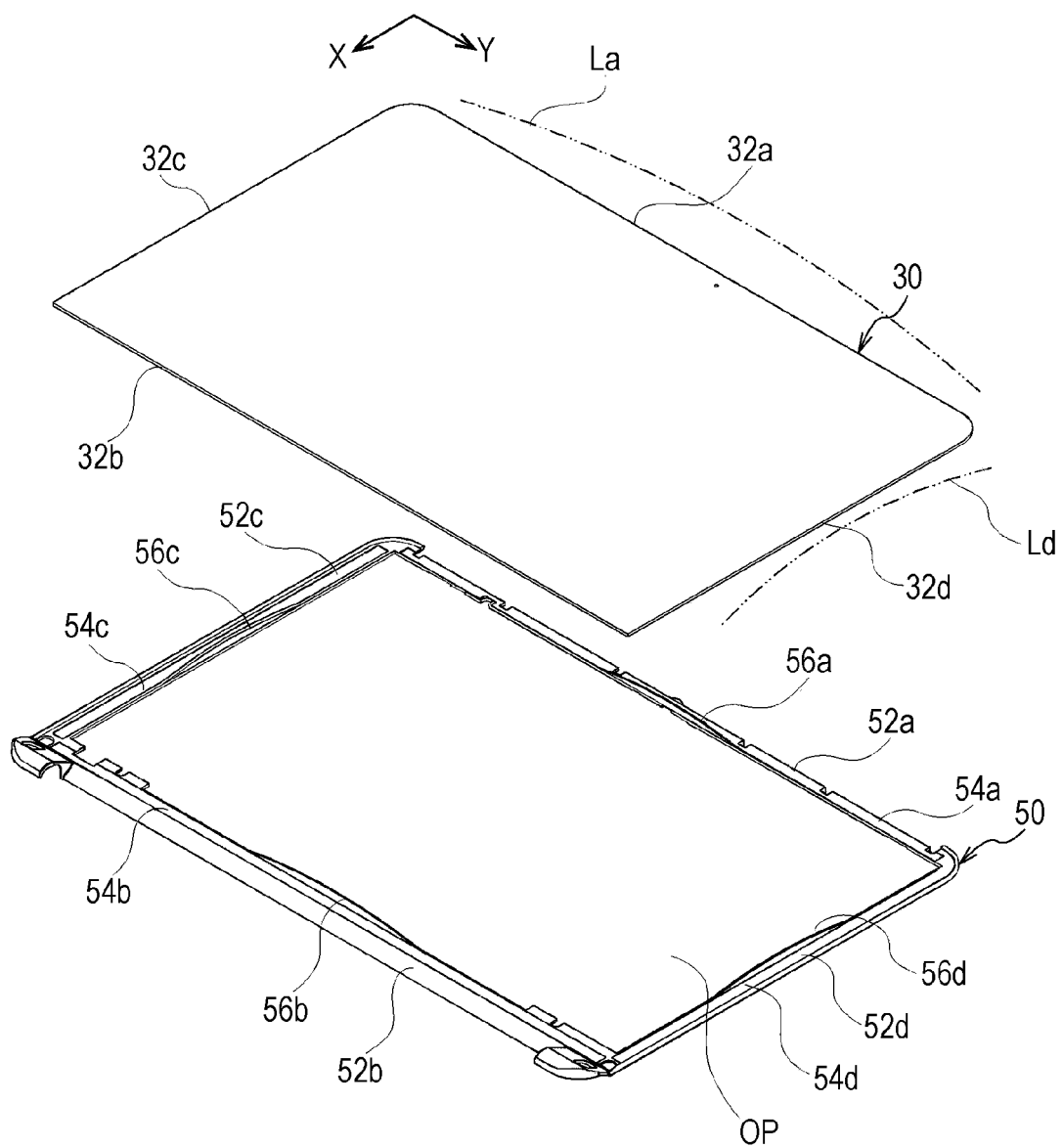
FIG. 3 is a diagram used to describe a panel and frame.

FIG. 3 is a diagram used to describe the panel 30 and the frame 50. In FIG. 3, the longitudinal direction of the sides 52a and 52b is defined as the Y-direction and the longitudinal direction of the sides 52c and 52d is defined as the X-direction. As depicted in FIG. 3, the sides 52a to 52d of the frame 50 have surfaces 54a to 54d. respectively, to which edges 32a to 32d of the panel 30 are secured, respectively. The surfaces 54a to 54d are oriented ahead of the screen DP. Projections 56a to 56d are formed on the surfaces 54a to 54d, respectively. The projections 56a to 56d project ahead of the display device D. The projections 56a to 56d extend in the longitudinal direction of the sides 52a to 52d. respectively. The projections 56a to 56d are disposed in a section other than both ends in the longitudinal direction of the sides 52a to 52d. more specifically in a section near the middle of the sides 52a to 52d. respectively. The projections 56a to 56d are formed on the inner side close to the opening OP on the surfaces 54a to 54d. respectively, not on the outer side away from the opening OP. In FIG. 3, the projections 56a to 56*d* are drawn with exaggeration. The outlines of the projections 56*a* to 56*d* are actually formed by straight lines unlike the shape depicted in FIG. 3, but the outlines may be formed by curved lines as depicted in FIG. 3.

Due to the projections 56*a* to 56*d*, the sides 52*a* to 52*d* have sections projecting ahead of the screen DP higher than both ends, in which the sections are other than both ends in the longitudinal direction. The projections 56*a* to 56*d* formed in this way cause the edges 32*a* to 32*d* of the panel 30 secured to the frame 50 to be bent ahead of the screen DP. More specifically, since the projection 56*a* is disposed in a section other than both ends of the side 52*a*. the edge 32*a* of the panel 30 is bent in the Y-direction. Similarly, the projection 56*b* causes the edge 32*b* to be bent in the Y-direction, the projection 56*c* causes the edge 32*c* to be bent in the X-direction, and the projection 56*d* causes the edge 32*d* to be bent in the X-direction. In FIG. 3, the shape of the edge 32*a* that was bent is indicated by curve La and the shape of the edge 32*d* that was bent is indicated by curve Ld.

In addition, the projections 56*a* to 56*d* cause the sides 52*a* to 52*d* to have inner sides projecting higher than outer sides, in which the inner sides are closer to the opening OP than the outer sides. The projections 56*a* and 56*b* formed in such positions cause the panel 30 to be bent in the X-direction. Similarly, the projections 56*c* and 56*d* formed in such positions cause the panel 30 to be bent in the Y-direction.

As described above, the projections 56*a* to 56*d* cause the edges 32*a* to 32*d* of the panel 30 secured to the frame 50 to be bent ahead of the screen DP. Accordingly, the panel 30 is bent ahead of the screen DP. Since the panel 30 is elastic, even when, for example, the panel 30 is pushed to make contact with the screen DP, the panel 30 gets away from the screen DP due to the elastic force of restitution of the panel 30. Even when the frame 50 is thin and the panel 30 is placed near the screen DP of the display device D, the panel 30 does not adhere to the screen DP. Accordingly, degradation in the visibility of the screen DP caused by adhesion of the panel 30 to the screen DP is suppressed.

Figure 4:
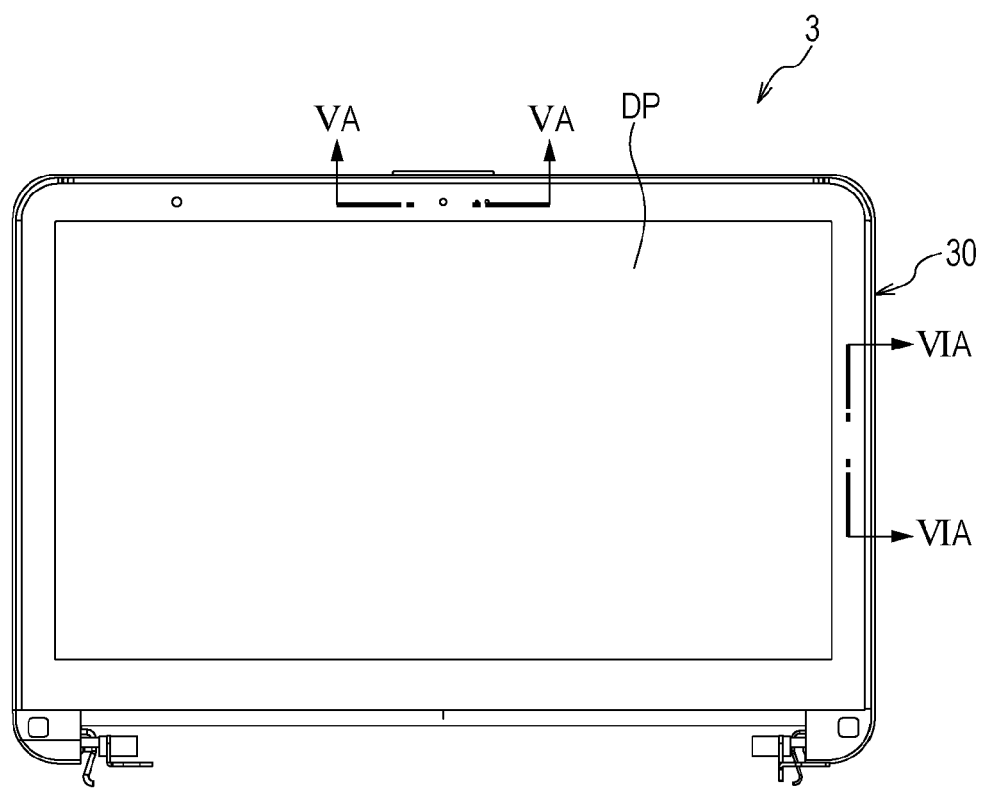
FIG. 4 is a front elevational view of the display unit.

Next, the actual shape of the projections 56*a* to 56*d* is described. FIG. 4 is a front elevational view of the display unit 3. FIG. 5A is a sectional view of section VA-VA in FIG. 4. FIG. 5B is a partial enlarged view of FIG. 5A. FIG. 6A is a sectional view of section VIA-VIA in FIG. 4. FIG. 6B is a partial enlarged view of FIG. 6A. As depicted in FIG. 5A, the projection 56*a* is split into two in the longitudinal direction of the side 52*a*. The two projections 56*a* may be formed as described above or only the one projection 56*a* may be formed. FIG. 5B is an enlarged view of a boundary Ba between the surface 54*a* and the projection 56*a*. As depicted in FIG. 6A, the projection 56*d* is disposed along the longitudinal direction of the side 52*d*. FIG. 6B is an enlarged view of a boundary Bd between the surface 54*d* and the projection 56*d*.

The projection may be formed on at least one of the sides 52*a* to 52*d*. This is because the panel 30 is bent so as to project ahead of the screen DP in a state in which the panel 30 is secured to the frame 50. Alternatively, the above projection may be disposed on at least two sides that face each other of the sides 52*a* to 52*d*.

In this embodiment, the projections 56*a* to 56*d* are formed on the four sides 52*a* to 52*d*. respectively, so all the edges 32*a* to 32*d* of the panel 30 are bent. When, for example, the projection is formed on a part of the sides to bend the panel 30, the panel 30 may be bent greatly in only one of the X-direction and the Y-direction. To obtain a relatively large elastic force of restitution in this case, the curvature of the panel 30 has to be increased. The panel 30 with a large curvature may provide a feeing of strangeness for the user. However, when the projections 56*a* to 56*d* are disposed on the four sides 52*a* to 52*d*. respectively, as in this embodiment, all the edges 32*a* to 32*d* of the panel 30 can be bent. This enables the entire panel 30 to be bent with substantially the same curvature in both the X-direction and the Y-direction. Therefore, a relatively large elastic force of restitution can be obtained with the curvature in the X-direction and the curvature in the Y-direction kept small. In this embodiment, it is possible to suppress an increase in the curvatures of the edges 32*a* to 32*d* while obtaining a relatively large elastic force of restitution of the panel 30, so that a feeing of strangeness is not provided for the user.

The projections 56*a* to 56*d* are disposed in sections, on the opening OP side, other than both ends in the longitudinal directions of the sides 52*a* to 52*d*. respectively, in this embodiment, but the present disclosure is not limited to this example. For example, the projection 56*a* may be disposed on an inner side close to the opening OP on both ends of the side 52*a*. Although the projection 56*a* is disposed in a section other than both ends of the side 52*a* in the this embodiment, the projection 56*a* may also be disposed on an outer side away from the opening OP of the side 52*a*. instead of on an inner side close to the opening OP of the side 52*a*. This is the same as in the projections of the other sides.

Figure 7:
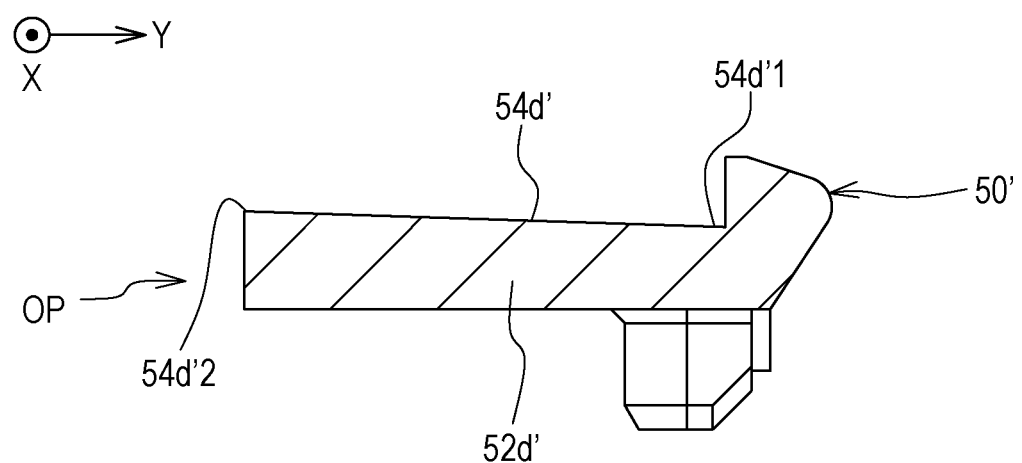
FIG. 7 is a diagram used to describe a modification of the frame.

A modification of the frame is described below. FIG. 7 is a diagram used to describe a modification of the frame. Components that are the same as in the above embodiment are given the same reference characters and descriptions will be omitted. FIG. 7 depicts a section of a side 52*d'* of a frame 50'. For a surface 54*d'* of the side 52*d'*, the height of an end 54*d'*2 on the inner side of the opening OP is larger than the height of an end 54*d'*1 on the outer side. As described above, the surface 54*d'* is slanted from the outer side to the inner side so as to project ahead of the screen DP. The panel 30 may be bent in this way. This surface 54*d'* may be formed so that a section other than both ends in a longitudinal direction of the side 52*d'* projects ahead of the screen DP higher than both ends. It is sufficient that such a surface is disposed on at least one side of the four sides. Alternatively, such a surface may be disposed on only two sides of the four sides that face each other or may be disposed on all sides.

Figure 8A:
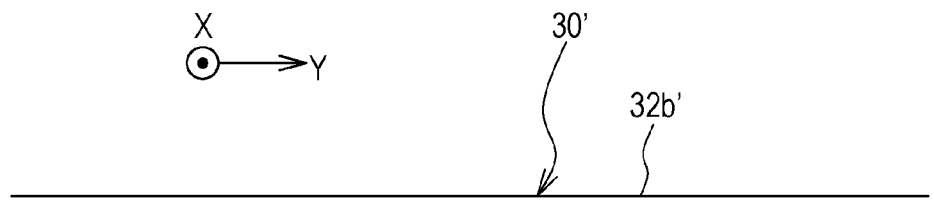
FIGS. 8A to 8D are diagrams used to describe a modification of the panel.
Figure 8B:
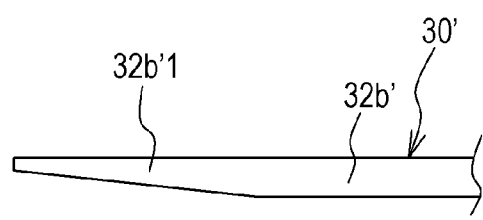

Next, a modification of the panel is described. FIGS. 8A to 8D is a diagram used to describe a modification of the panel. FIG. 8B is a partial enlarged view of FIG. 8A. In FIGS. 8A to 8D, the upper side of the panel 30' indicates the front. As depicted in FIG. 8B, the thickness at both ends 32*b*1' in the longitudinal direction of an edge 32*b'* of the panel 30' is smaller than the thickness of a section other than both ends 32*b*1'. In other words, the thickness of the middle in the longitudinal direction of the edge 32*b'* is larger than the thickness at both ends 32*b*1'. Accordingly, when the panel 30' is secured to the frame, the edge 32*b'* of the panel 30' is bent.

Figure 8C:
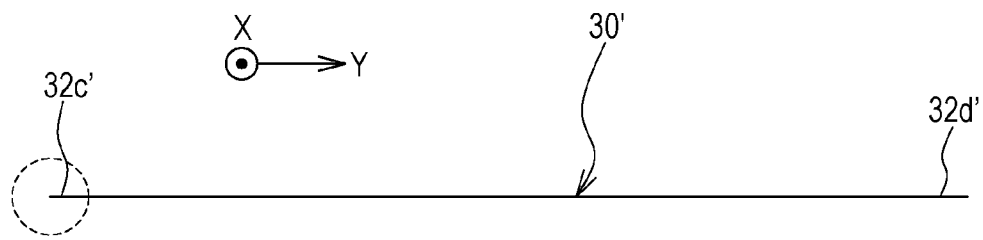
Figure 8D:
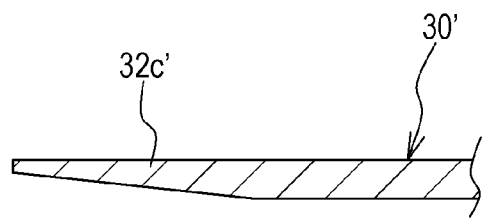

FIG. 8C is a sectional view of a section of the panel 30' cut in the Y-direction. FIG. 8D is a partial enlarged view of FIG. 8C. An edge 32*c'* of the panel 30' is formed so as to reduce in thickness from the middle to the perimeter of the panel 30', as depicted in FIG. 8D. More specifically, a surface of the edge 32*c'* on the side secured to the sides of the frame is slanted. Accordingly, when the panel 30' is secured to the frame, the panel 30' is bent in the Y-direction. As described above, the panel 30' secured to the frame may be bent in accordance with the shape of the side of the panel 30'.

It is sufficient that at least one of the four edges of the panel 30' is formed as described above. Alternatively, at least two edges of the four edges of the panel 30' that face each other may be formed as described above or all edges may be formed as described above.

The surfaces of the sides of the frame 50 may be planar and another member may be adhered to the inner side of the sides so that the inner sides of the sides project higher than the outer side. An example of the other member is a double-faced tape. The display device may have a touch panel. The shapes of the panel and frame described above are only examples and not limited to the shapes.

The preferred embodiment is described in detail above, but the present disclosure is not limited to the specific embodiment and various modifications or changes may be made if there is no departure from the main spirit of the present disclosure.

In the above embodiment, a notebook computer is used as an example of the display apparatus, but the display apparatus is not limited to a notebook computer. For example, a tablet computer, mobile phone, mobile television set, electronic dictionary, personal digital assistant (PDA), game machine, camera, music player, navigation system, etc. may be used. The display apparatus may be of stationary type instead of mobile type. For example, the display apparatus may be a display monitor for a desktop computer, a monitor including a computer, television set, audio system, or other home electric appliances.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display apparatus comprising:
    a display device body with a screen;
    a frame attached to the display device body, the frame having an opening for exposing the screen; and
    a panel secured to the frame so as to face the screen, the panel being elastic;
    wherein the frame has four sides to which the panel is secured and
    at least one of the four sides has a section projecting toward the panel higher than both ends of the at least one of the four sides with respect to a longitudinal direction of the at least one of the four sides, the section being other than the both ends in the longitudinal direction of the at least one of the four sides, and
    wherein the section of the frame projecting toward the panel contacts the panel and causes an edge of the panel to bend away from the screen.

2. The display apparatus according to claim 1, wherein a projection is formed on the section other than both ends on a surface of the at least one of the four sides.

3. The display apparatus according to claim 1, wherein the panel covers a center of the screen.

4. A display apparatus comprising:
    a display device body with a screen;
    a frame attached to the display device body, the frame having an opening for exposing the screen; and
    a panel secured to the frame so as to face the screen, the panel being elastic;
    wherein the frame has four sides to which the panel is secured and
    at least one of the four sides has an inner side projecting toward the panel higher than an outer side, the inner side being closer to the opening than the outer side,
    wherein the inner side of the frame projecting toward the panel contacts the panel and causes an edge of the panel to bend away from the screen.

5. The display apparatus according to claim 4, wherein a projection is formed on the inner side on a surface of the at least one of the four sides.

6. The display apparatus according to claim 4, wherein a surface of the at least one of the four sides is slanted from the outer side to the inner side so as to project toward the panel.

7. The display apparatus according to claim 4, wherein the panel covers a center of the screen.

* * * * *